United States Patent [19]

Hoshina

[11] Patent Number: 5,571,958
[45] Date of Patent: Nov. 5, 1996

[54] APPARATUS AND METHOD FOR DETECTING MISFIRE IN AN INTERNAL COMBUSTION ENGINE

[75] Inventor: Atsumi Hoshina, Atsugi, Japan

[73] Assignee: Unisia Jecs Corporation, Atsugi, Japan

[21] Appl. No.: 422,550

[22] Filed: Apr. 13, 1995

[30] Foreign Application Priority Data

Apr. 15, 1994 [JP] Japan ..................................... 6-077343

[51] Int. Cl.⁶ ................................................. G01M 15/00
[52] U.S. Cl. ......................................... 73/117.3; 73/35.06
[58] Field of Search ........................... 73/35.03, 35.04, 73/35.06, 115, 116, 117.3, 118.2

[56] References Cited

U.S. PATENT DOCUMENTS

| | | | |
|---|---|---|---|
| 4,781,059 | 11/1988 | Suzuki et al. | 73/117.3 |
| 4,821,194 | 4/1989 | Kawamura | 73/35.06 |
| 4,996,959 | 3/1991 | Akimoto | 73/118.2 |
| 5,116,259 | 5/1992 | Demizu et al. | 73/117.3 |
| 5,127,262 | 7/1992 | Demizu et al. | 73/117.3 |
| 5,309,756 | 5/1994 | Osawa et al. | 73/116 |

FOREIGN PATENT DOCUMENTS

| | | |
|---|---|---|
| 63-17432 | 2/1988 | Japan . |
| 64-15937 | 1/1989 | Japan . |
| 4-81557 | 3/1992 | Japan . |

*Primary Examiner*—Richard Chilcot
*Assistant Examiner*—Eric S. McCall
*Attorney, Agent, or Firm*—Foley & Lardner

[57] ABSTRACT

A basic injection pulse width Tp which is representative of engine load is weightingly averaged, and a judgment value is set based on the weighted average value. The combustion pressure is integrated over a predetermined integral interval and when the combustion pressure integral value is below the judgment value, misfire is judged to have occurred. When the frequency of misfire is more than or equal to a predetermined value, a warning is given.

10 Claims, 6 Drawing Sheets

APPARATUS AND METHOD FOR DETECTING MISFIRE IN AN INTERNAL COMBUSTION ENGINE

FIELD OF THE INVENTION

The present invention relates to an apparatus and method for detecting misfire in an internal combustion engine, and in particular to an apparatus and method which detects the presence and absence of misfire by judging a detection value for combustion pressure, on the basis of a judgment value set in accordance with engine load.

DESCRIPTION OF THE RELATED ART

Conventional internal combustion engine misfire detection apparatuses, such as disclosed in Japanese Unexamined Utility Model Publication No. 64-15937, detect misfire by detecting the combustion pressure (cylinder pressure) of the internal combustion engine, and comparing a maximum value for the combustion pressure or an integral value over a predetermined integral interval of the combustion pressure, with a judgment value set in accordance with engine load, and when the actual combustion pressure is lower than the judgment value, estimating that the reduction in combustion pressure is due to misfire.

Heretofore the engine load has been represented for example by a basic fuel injection quantity Tp (a value corresponding to the cylinder intake air quantity of the engine) computed in an electronically controlled fuel injection apparatus, and the judgment value set based on the basic fuel injection quantity Tp. However with such a construction, at the time of acceleration the judgment value becomes inappropriate so that there is a deterioration in misfire detection accuracy.

More specifically, at the time of acceleration, the increase change in combustion pressure is slower than the increase change in the basic fuel injection quantity Tp. Therefore when the judgment value is set based on the basic fuel injection quantity Tp, at the time of acceleration, the judgment value rises before the combustion pressure due to the response delay of the combustion pressure.

Consequently, at the time of acceleration the judgment value is set unduly large. Therefore there is the likelihood of erroneous detection of misfire due to the combustion pressure being judged as lower than the judgment value, in spite of combustion being carried out normally.

SUMMARY OF THE INVENTION

In view of the above problem, it is an object of the present invention to be able to avoid the erroneous detection of the occurrence of misfire at the time of acceleration in an apparatus wherein misfire detection is carried out based on a comparison of a judgment value corresponding to engine load with the combustion pressure.

To achieve the above object, the apparatus and method for detecting misfire in an internal combustion engine according to the present invention includes, setting a judgment value for the combustion pressure based on an average value of the engine load, judging the presence or absence of misfire based on a comparison of the judgment value with an actual value for combustion pressure, and outputting a misfire detection signal.

With such a construction, the presence or absence of misfire is detected based on a comparison of a detection value for the combustion pressure with a judgment value corresponding to engine load. For the engine load which forms the basis for the judgment value, an engine load which has been subjected to an averaging process is used, and not the momentary value at the time.

Accordingly, at the time of acceleration, the rise in the engine load, which forms the basis of the judgment value setting, is slower than that of the detection value for the engine load. Therefore the judgment value can be set to correspond closer to the rise of the combustion pressure which is slower than the rise in the engine load.

The construction may involve integrating the combustion pressure over a predetermined integral interval, and outputting a misfire detection signal indicating the occurrence of misfire when the combustion pressure integral value is less than the judgment value.

With such a construction, a drop in combustion pressure due to misfire can be detected accurately without the influence of noise and the like, by detecting misfire based on the integral value of the combustion pressure, and not using the momentary value for the combustion pressure.

The engine load may be represented by a value corresponding to a cylinder intake air quantity of the engine.

With such a construction, the engine load can be easily detected by using for example a basic fuel injection quantity (basic injection pulse width) computed in an electronically controlled fuel injection unit.

Under deceleration operating conditions of the engine, a judgment value set based on the actual engine load at the time may be used instead of the judgment value set based on an average value of the engine load.

At the time of acceleration, it is necessary to set the judgment value based on an averaged engine load so as to correspond to the response delay of the combustion pressure. However at the time of deceleration, since the change in combustion pressure occurs with a relatively good response in correspondence with the change in engine load, then if the judgment value is set based on the averaged engine load, the judgment value shows a response delay with respect to the combustion pressure change. Therefore at the time of acceleration, the misfire detection accuracy is maintained by the averaging process of the engine load, while at the time of deceleration, the misfire detection accuracy is maintained by setting the judgment value using the detected engine load without change.

Here the deceleration operating conditions of the engine may be detected based on a change in throttle opening of the engine.

With such a construction, the deceleration operating condition can be detected with good response.

Moreover, the construction may be such that a warning of misfire is given when a number of outputs of the misfire detection signal indicating the occurrence of misfire, for a predetermined number of firings, is greater than or equal to a predetermined number.

With such a construction, the driver can be warned that the frequency of misfiring is more than or equal to a predetermined value.

Further objects and aspects of the present invention will become apparent from the following description of the embodiments given in conjunction with the appended drawings.

DESCRIPTION OF THE PREFERRED EMBODIMENTS

As follows is a description of embodiment of the present invention.

Figure 2:
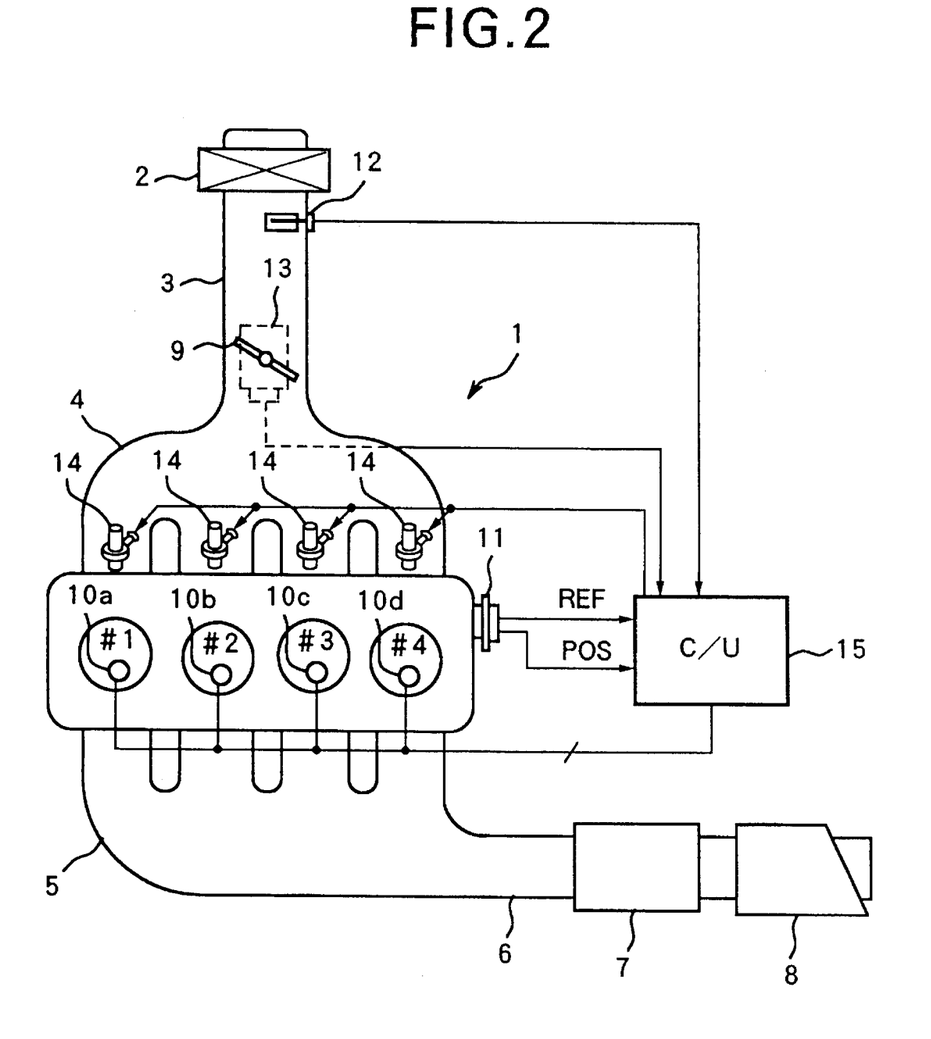
FIG. 2 is a schematic system diagram illustrating an embodiment of the present invention.

In FIG. 2 which shows an embodiment of the present invention, an engine 1 draws in air by way of an air cleaner 2, a throttle chamber 3 and an intake manifold 4. Exhaust gas from the engine 1 is discharged to the atmosphere by way of an exhaust manifold 5, an exhaust duct 6, a three way catalytic converter 7 and a muffler 8.

The throttle chamber 3 is provided with throttle valve 9 which opens/closes, and which is connected to an accelerator pedal (not shown). The throttle valve 9 enables adjustment of the intake air quantity to the engine 1.

Respective ignition plugs (omitted from the figure) are fitted so as to face into the combustion chambers of respective cylinders (#1–#4), and respective cylinder pressure sensors 10a–10d (combustion pressure detection devices) are provided as a set with the ignition plugs for each cylinder.

For the cylinder pressure sensors 10a–10d, a type which is fitted as an ignition plug washer such as disclosed in Japanese Unexamined Utility Model Publication No. 63-17432 is used. More specifically, the cylinder pressure sensors 10a–10d are made from piezo-electric elements or electrodes formed into a ring shape, which is clamped between the ignition plug and the cylinder head, and which outputs a pressure detection signal corresponding to a displacement of the ignition plug due to cylinder pressure.

The cylinder pressure sensors 10a–10d however are not limited to the above mentioned washer type, and may for example comprise types such as disclosed in Japanese Unexamined Patent Publication No. 4-81557 wherein a sensor portion faces directly into the combustion chamber to detect the cylinder pressure as an absolute value.

A crank angle sensor 11 is provided on the cam shaft (not shown) of the engine 1, for detecting the crank angle from rotation of the cam shaft.

The crank angle sensor 11 respectively outputs a reference angle signal REF for each 180° crank angle (which corresponds to the stroke phase difference between cylinders in the four cylinder engine 1 of the embodiment), and outputs a unit angle signal POS for each unit crank angle (1° or 2°).

An airflow meter 12 is provided upstream of the throttle valve 9 for detecting the intake air quantity Q of the engine 1. The throttle valve 9 is provided with a potentiometer type throttle sensor 13 for detecting the throttle valve opening TVO.

Solenoid type fuel injection valves 14 are provided for each cylinder in respective branch portions of the intake manifold 4. The fuel injection valves 14 intermittently inject fuel which has been controlled to a predetermined pressure by means of a pressure regulator (not shown): into the engine 1, in accordance with an injection pulse signal.

Detection signals from the cylinder pressure sensors 10a–10d, the crank angle sensor 11, the airflow meter 12 and the throttle sensor 13 are output to a control unit 15 provided for engine control.

The control unit 15 which incorporates a microcomputer, controls the injection quantity (injection pulse width Ti) of the fuel injection valves 14, based on the outputs from the respective sensors, to produce a mixture having a predetermined air-fuel ratio.

The control unit 15 computes a basic injection pulse width Tp (basic fuel injection quantity), based on the intake air quantity Q detected by the airflow meter 12, and the engine rotational speed Ne computed based on the detection signal from the crank angle sensor 11 (Tp=K×Q/Ne; where K is a constant). Moreover, it sets for example various correction coefficients CO based on engine operating conditions such as cooling water temperature Tw, as well as a correction amount Ts for the battery voltage. It then corrects the basic injection pulse width Tp, and the corrected result becomes the final injection pulse width Ti (fuel injection quantity). An injection pulse signal of the injection pulse width Ti is then output to the fuel injection valves 14 at a predetermined injection timing, to thereby control fuel injection from the fuel injection valves 14.

Figure 3:
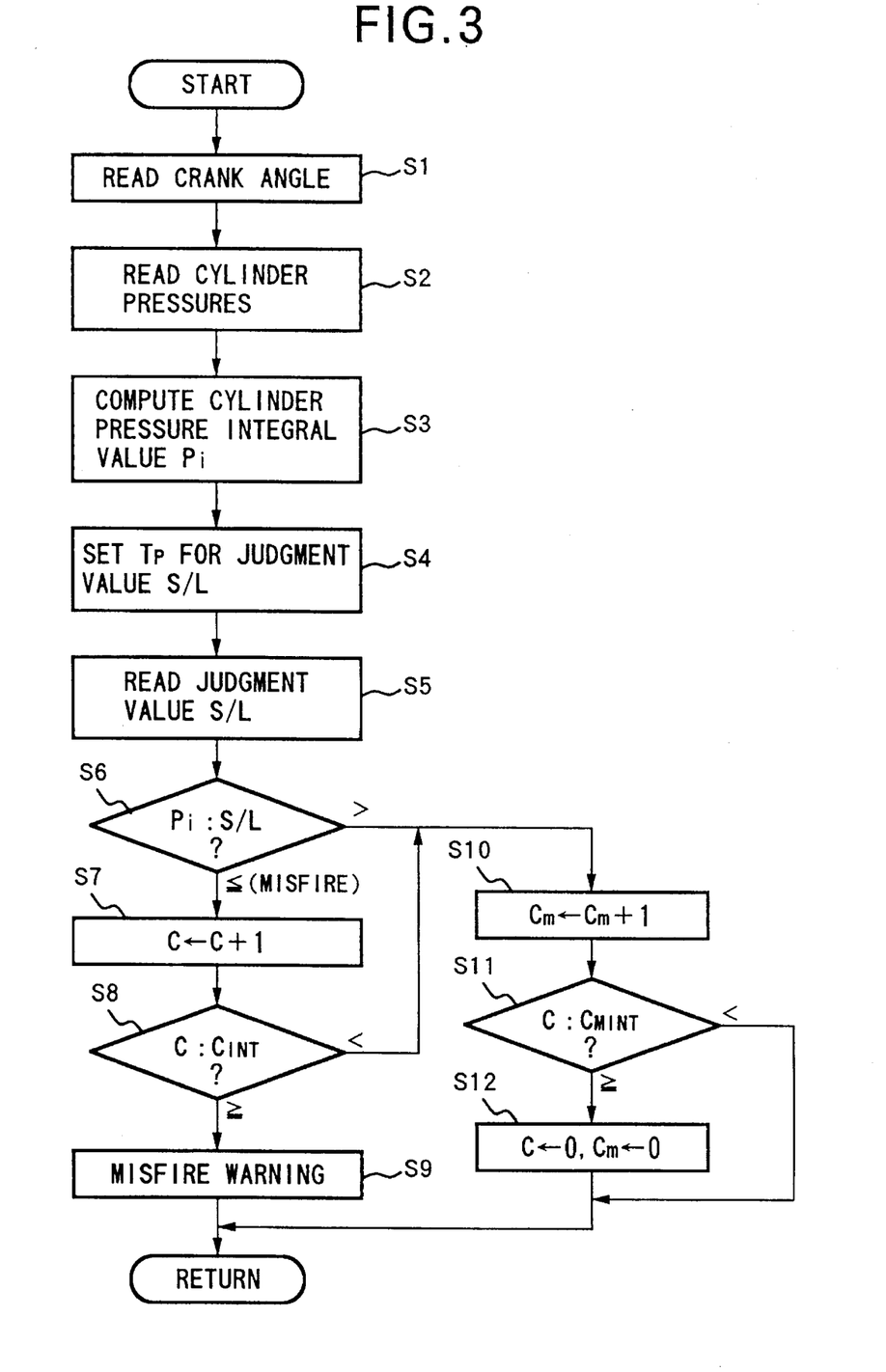
FIG. 3 is a flow chart illustrating aspects of a misfire detection routine according to the embodiment.
Figure 4:
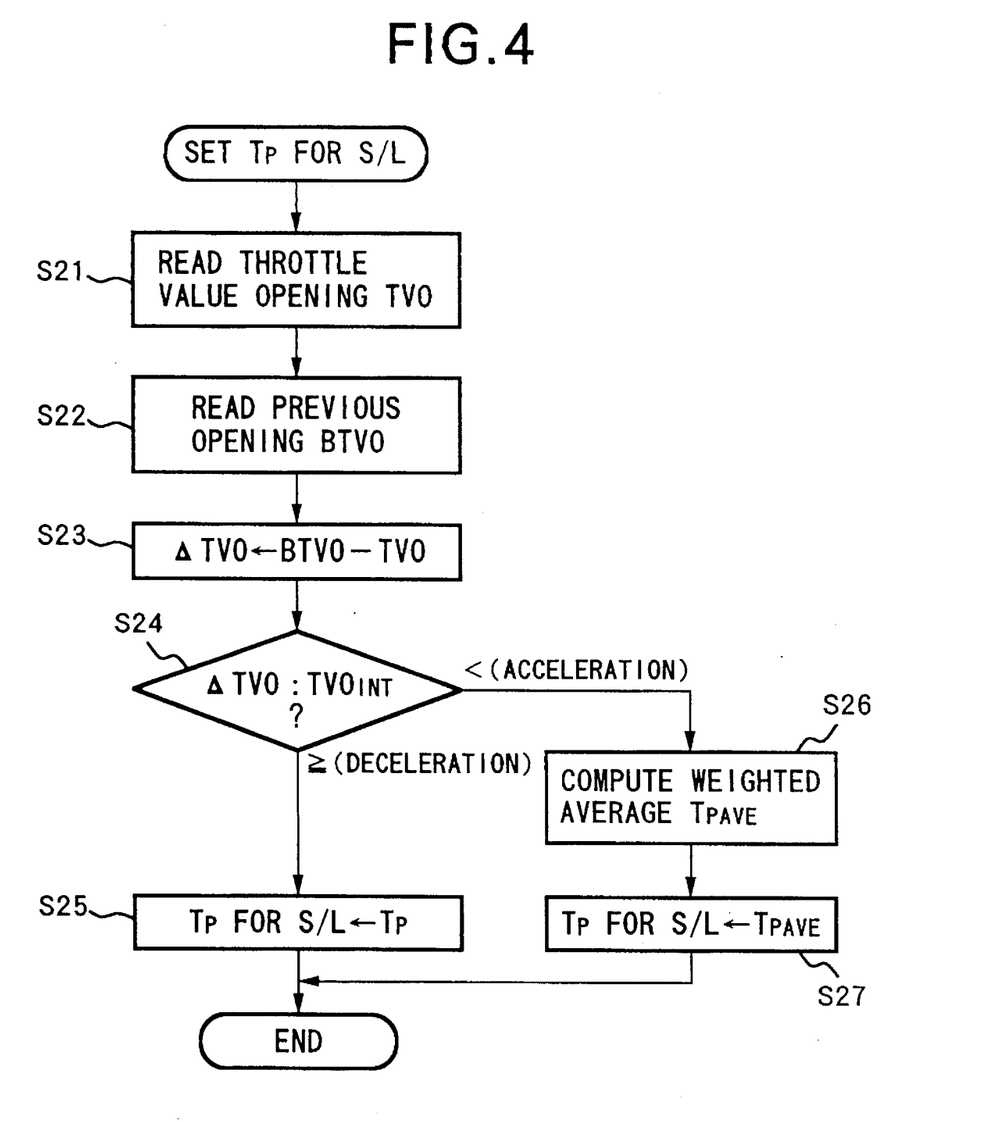
FIG. 4 is a flow chart showing a setting control routine for a basic injection pulse width Tp used in the judgment value setting of the embodiment.

As shown by the flow charts of FIG. 3 and FIG. 4, the control unit 15 detects the presence or absence of misfire in the engine 1, based on the combustion pressure detected by the cylinder pressure sensors 10a–10d.

Figure 1:
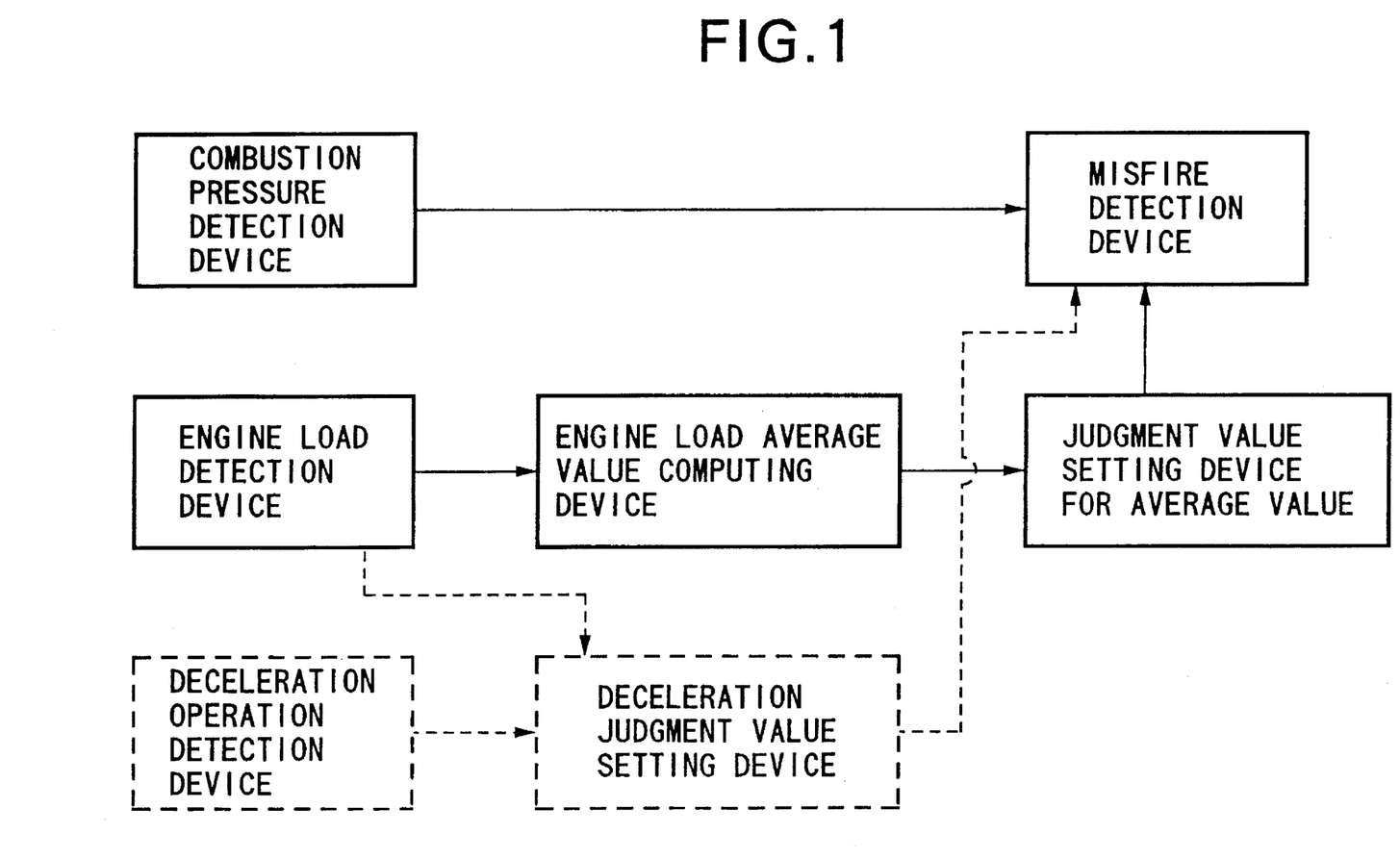
FIG. 1 is a block diagram showing a basic construction of a misfire detection apparatus according to the present invention.

In the present embodiment, the misfire detection device, the judgment value setting device for the average value, the engine load average value computing device, and the judgment value setting device for deceleration (see FIG. 1) are realised by software illustrated by the flow charts of FIG. 3 and FIG. 4 and stored in the control unit 15. The function of the deceleration operation detection device is realised by the throttle sensor 13 and the software functions of the control unit 15.

In the flow chart of FIG. 3, in step 1, (with "step" denoted by S in the figures) the current crank angle position is detected based on a detection signal from the crank angle sensor 11.

In step 2, a cylinder pressure P detected by the cylinder pressure sensors 10a–10d is read.

Then in step 3, the read cylinder pressure P (combustion pressure) is integrated for each cylinder over a pre-set predetermined integral interval for each single combustion cycle of the respective cylinders (for example from 10° BTDC to 70° ATDC, or from 10° BTDC to 100° ATDC), to obtain a cylinder pressure integral value Pi (combustion pressure integral value).

In step 4, the basic injection pulse width Tp is set. The basic injection pulse width Tp is the parameter used at the time in retrieving and obtaining from a map, a judgment value S/L for comparison with the cylinder pressure integral value Pi.

The basic injection pulse width Tp is a value corresponding to the cylinder intake air quantity of the engine 1. Hence the basic injection pulse width Tp (basic fuel injection quantity), in the present embodiment, is a value representing the engine load.

Consequently, the airflow meter 12 which detects the intake air quantity Q which forms the basis for computing the basic injection pulse width Tp, the crank angle sensor 11 which detects the engine rotational speed Ne, and the computational functions of the control unit 15, constitute the engine load detection device of the present embodiment.

In step 5, a map in which the judgment value S/L has been pre-stored corresponding to the basic injection pulse width Tp and the engine rotational speed Ne, is looked up based on the basic injection pulse width Tp set in step 4, and the engine rotational speed Ne computed based on the detection signal from the crank angle sensor 11, and the corresponding judgment value S/L is read.

In step 6, the judgment value S/L read in step 5 and the cylinder pressure integral value Pi computed in step 3 are compared.

When cylinder pressure integral value Pi is judged to be less than or equal to the judgment value S/L, it is judged that the combustion pressure has been reduced due to misfire, and a misfire detection signal is output. At the time of this misfire detection, control proceeds to step 7 where a count Value C for counting the number of misfire detections is increased by 1.

Then in step 8, the count value C and a predetermined value $C_{INT}$ are compared, and when the count value C is greater than or equal to the predetermined value $C_{INT}$, control proceeds to step 9 where a warning of misfire is given.

The warning of misfire may involve for example the flashing of a warning lamp provided as a warning device on the vehicle instrument panel.

On the other hand, when judged in step 6 that the cylinder pressure integral value Pi exceeds the judgment value S/L, thus detecting that misfire is not occurring, and when judged in step 8 that the count value C is less than the predetermined value $C_{INT}$, control proceeds to step 10.

In step 10, a count value Cm which counts the number of judgments of the presence or absence of misfire, is increased by 1. Then in step 11, the count value Cm and a predetermined value $C_{mINT}$ are compared, and when the count value Cm is greater than or equal to the predetermined value $C_{mINT}$, control proceeds to step 12 where the count values C and Cm are reset to "0".

Accordingly the judgment in step 8 judges whether or not the misfire judgment count exceeds the predetermined value $C_{INT}$ per predetermined value $C_{mINT}$ for misfire detection. In other words the construction is such that a warning is given when for a predetermined number of firings there is more than a predetermined proportion of misfires.

The processing of the basic injection pulse width Tp in step 4 set for the judgment value S/L is carried out according to the flow chart of FIG. 4.

In the flow chart of FIG. 4, in step 21 the latest throttle valve opening TVO detected by the throttle sensor 13 is read.

In the step 22, the throttle valve opening TVO read and stored a predetermined period beforehand is read as a previous value BTVO.

In step 23, a difference ΔTVO between the previous value BTVO and the latest throttle valve opening TVO (ΔTVO= BTVO–TVO) is computed as a value indicating the amount of change in throttle valve opening TVO per unit time. Then in step 24, it is judged if the engine 1 is accelerating or decelerating, by comparing the difference ΔTVO and a predetermined value $TVO_{INT}$.

In step 24, when judged that the difference ΔTVO is greater than or equal to the predetermined value $TVO_{INT}$, then it is judged that the engine 1 is decelerating (or is stationary), and control proceeds to step 25 where the value used in the fuel injection control is set without change as the basic injection pulse width Tp used at the time of referring to the map of judgment values S/L.

On the other hand in step 24, when judged that the difference ΔTVO is less than the predetermined value $TVO_{INT}$, then it is judged that the engine 1 is accelerating (or is stationary), and control proceeds to step 26.

In step 26, the basic injection pulse width Tp computed for the fuel injection control is weightingly averaged to obtain a weighted average value $T_{pAVE}$. The weighted average value $T_{pAVE}$ can be computed for example as $T_{pAVE}=(Tp+3\times T_{pAVE}-1)/4$ where $T_{pAVE}-1$ is the previous weighted average value.

Then in step 27, the weighted average value $T_{pAVE}$ is set as the basic injection pulse width Tp used at the time of referring to the map of judgment values S/L.

Therefore, at least under conditions wherein the engine 1 is accelerating, the judgment value S/L is set based on the weightingly averaged basic injection pulse width Tp, while at least under conditions wherein the engine 1 is decelerating, the judgment value S/L is set using the basic injection pulse width Tp computed for injection control without change.

Figure 5:
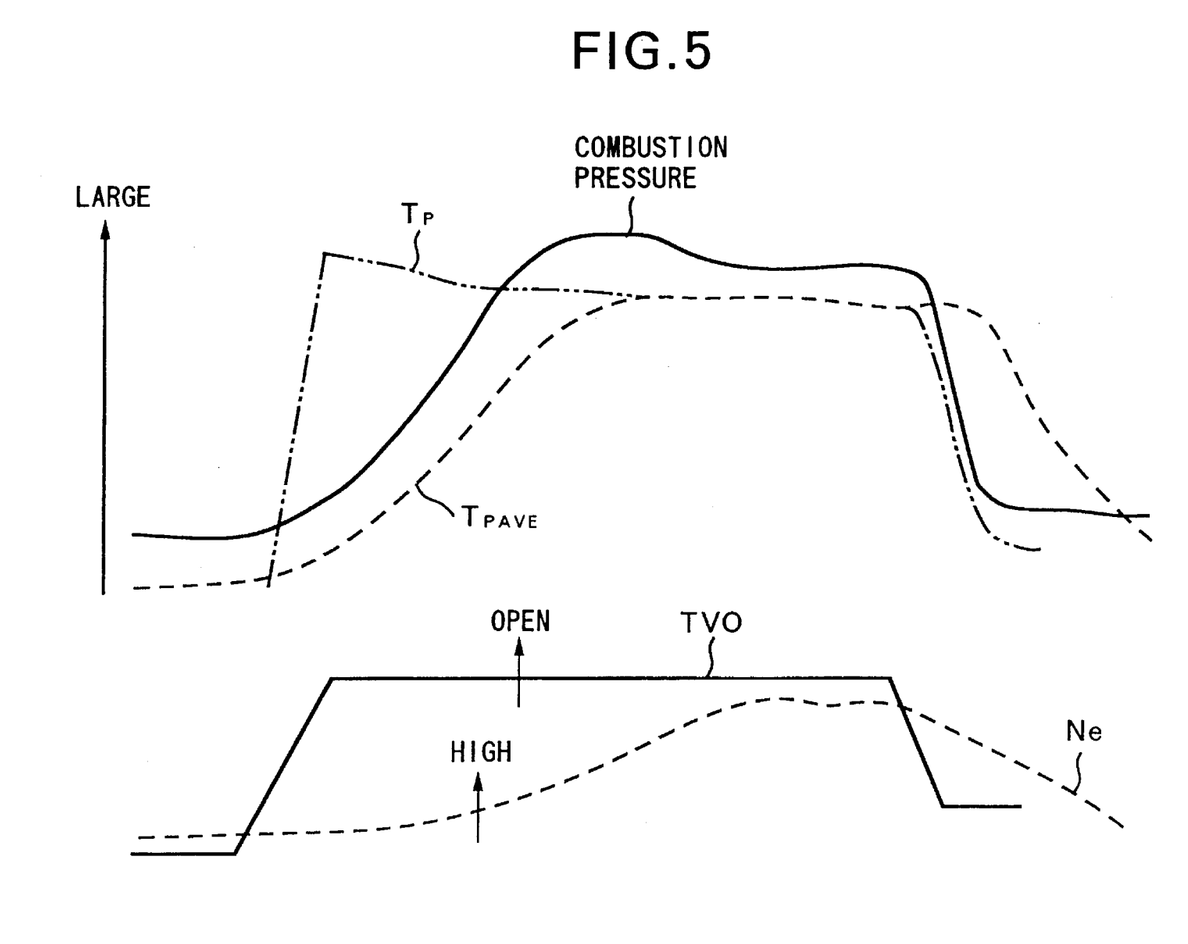
FIG. 5 is a time chart showing characteristics of the basic injection pulse width Tp which forms the basis of the judgment value in the embodiment.
Figure 6:
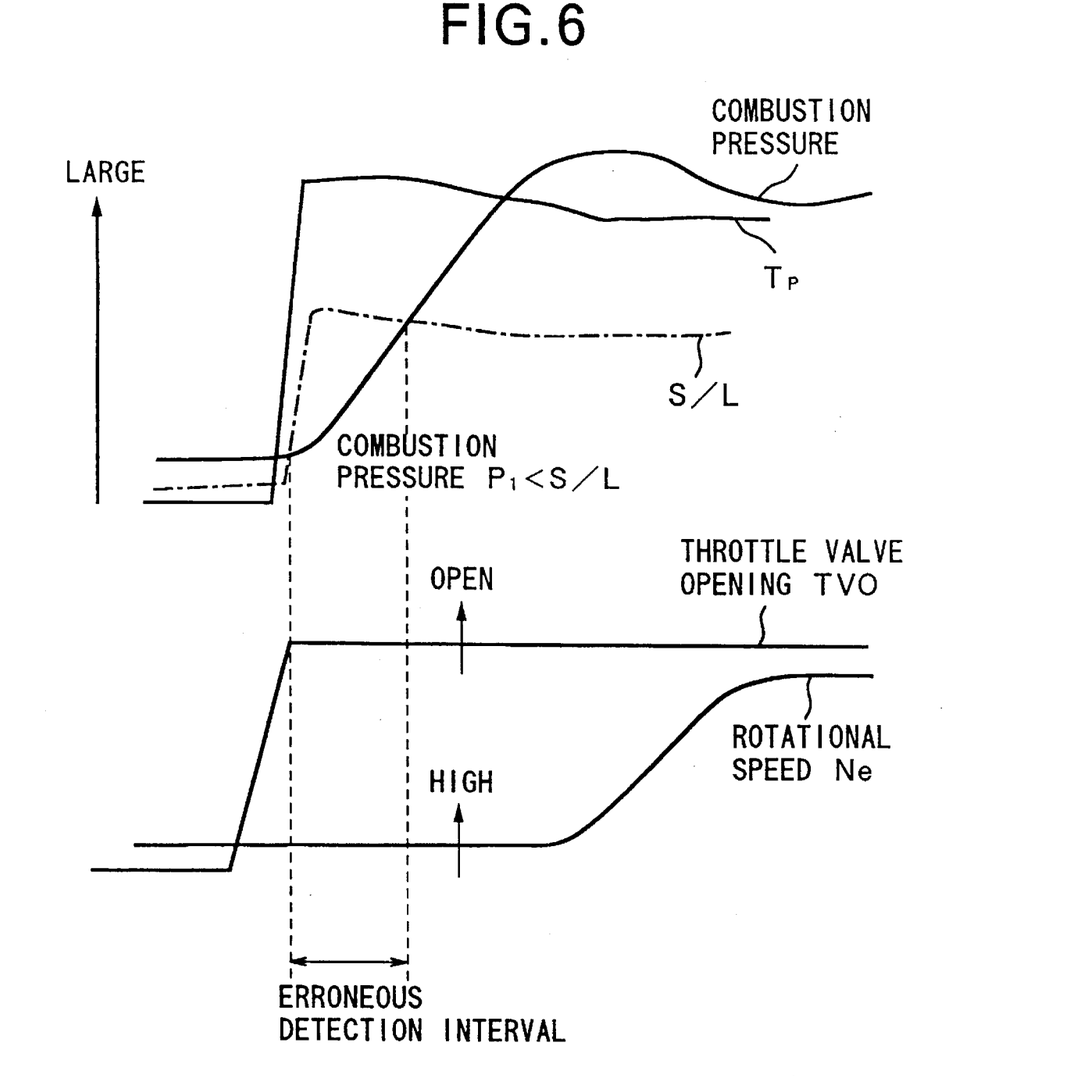
FIG. 6 is a time chart for explaining problems when setting a judgment value using the basic injection pulse width Tp without change.

As shown in FIG. 5, when the engine 1 is accelerating, the combustion pressure rise is slow compared to the increase change in the basic injection pulse width Tp (intake air quantity). Therefore if the judgment value S/L is set using the basic injection pulse width Tp without change, there is the possibility of the delay in the combustion pressure rise being erroneously detected as a misfire (refer to FIG. 6).

With the present embodiment, in the accelerating condition, the judgment value S/L is set based on the weighted average value $T_{pAVE}$ of the basic injection pulse width Tp. Therefore, the judgment value S/L increasingly changes in correspondence with the increase change in combustion pressure. Hence at the time of acceleration, there is no erroneous detection of misfire based on an inappropriate judgment value S/L.

On the other hand, as shown in FIG. 5, when the engine 1 is decelerating, the combustion pressure reducingly changes with comparatively good response in correspondence with the reducing change in the basic injection pulse width Tp (intake air quantity). Therefore if the judgment value S/L is set based on the weighted average value $T_{pAVE}$, in contrast to for the time of acceleration, there is the possibility of erroneous detection of misfire.

Therefore with the present embodiment, at the time of deceleration, the judgment value S/L is set using the basic injection pulse width Tp computed for fuel injection control without change, thus avoiding erroneous detection of misfire.

In the flow chart of FIG. 4, the judgment of the acceleration/deceleration condition of the engine 1 was carried out based on a change in the throttle valve opening TVO. However, a construction is also possible wherein judgment is made based on, for example, a change in the basic injection pulse width Tp.

With the weighted average processing of the basic injection pulse width Tp in step 26 of the flow chart of FIG. 4, the weighting is changed based on parameters which indicate acceleration, such as the abovementioned ΔTVO. Therefore in correspondence with the characteristics of the response delay of the combustion pressure, the setting accuracy for the judgment value S/L can be further increased. For the parameters showing acceleration, as well of the throttle valve opening ΔTVO, it is possible to use a change rate in the intake air quantity or in the basic injection pulse width Tp.

Furthermore, with the above embodiment, the construction is such that misfire is detected by comparing the cylinder pressure integral value Pi and the judgment value S/L. However a construction is also possible wherein the maximum combustion pressure is obtained from the detection result of the cylinder pressure sensors 10*a*–10*d*, and the maximum combustion pressure and the judgment value S/L are compared to determine misfire.

I claim:

1. An apparatus for detecting misfire in an internal combustion engine comprising:

combustion pressure detection means for detecting a combustion pressure value of the engine, engine load detection means for detecting an engine load, engine load average value computing means for computing an average value of the engine load detected by the engine load detection means, deceleration operation detection means for detecting a deceleration operating condition of the engine, judgment value setting means for setting a judgment value based on the computed average engine load value, decelerating judgment value setting means for setting the judgment value based on the detected engine load value, and misfire detection means for judging the presence or absence of misfire based on a comparison of the detected combustion pressure value and the judgment value based on the computed average engine load value or based on the detected engine load value instead of the computed average engine load value when the engine deceleration operating condition is detected, and outputting a misfire detection signal.

2. An apparatus for detecting misfire in an internal combustion engine according to claim 1, wherein said misfire detection means outputs a misfire detection signal indicating the occurrence of misfire when an integral value of the combustion pressure detected by said combustion pressure detection means over a predetermined integral interval is less than said judgement value.

3. An apparatus for detecting misfire in an internal combustion engine according to claim 1, wherein said engine load detection means detects a value corresponding to a cylinder intake air quantity of the engine, as the engine load.

4. An apparatus for detecting misfire in an internal combustion engine according to claim 1, wherein said deceleration operation detection means detects a deceleration operating condition of the engine, based on a change in throttle opening of the engine.

5. An apparatus for detecting misfire in an internal combustion engine according to claim 1, provided with means for warning of misfire when a number of outputs from said misfire detection means of misfire detection signals indicating the occurrence of misfire, for a predetermined number of firings, is greater than or equal to a predetermined number.

6. A method of detecting misfire in an internal combustion engine comprising:

detecting an engine combustion pressure value, detecting an engine load value, detecting a deceleration operating condition of the engine, computing an average engine load value based on the detected engine load value, setting a judgment value for an engine combustion pressure based on the computed average engine load value and setting the judgment value based on the detected engine load instead of the computed average engine load value when the engine deceleration operating condition is detected, and judging the presence or absence of misfire based on a comparison of the judgment value with the actual engine combustion pressure value, and outputting a misfire detection signal.

7. A method of detecting misfire in an internal combustion engine according to claim 6, further comprising integrating said combustion pressure over a predetermined integral interval, and outputting a misfire detection signal indicating the occurrence of misfire when the combustion pressure integral value is less than said judgment value.

8. A method of detecting misfire in an internal combustion engine according to claim 6, wherein said engine load is represented by a value corresponding to a cylinder intake air quantity of the engine.

9. A method of detecting misfire in an internal combustion engine according to claim 6, wherein the deceleration operating condition of the engine is detected based on a change in throttle opening of the engine.

10. A method of detecting misfire in an internal combustion engine according to claim 6, wherein warning of misfire is given when a number of outputs of misfire detection signals indicating the occurrence of misfire, for a predetermined number of firings, is above a predetermined number.

\* \* \* \* \*